May 6, 1924.
C. B. MALOY
HANDLE
Filed March 20, 1923
1,493,360
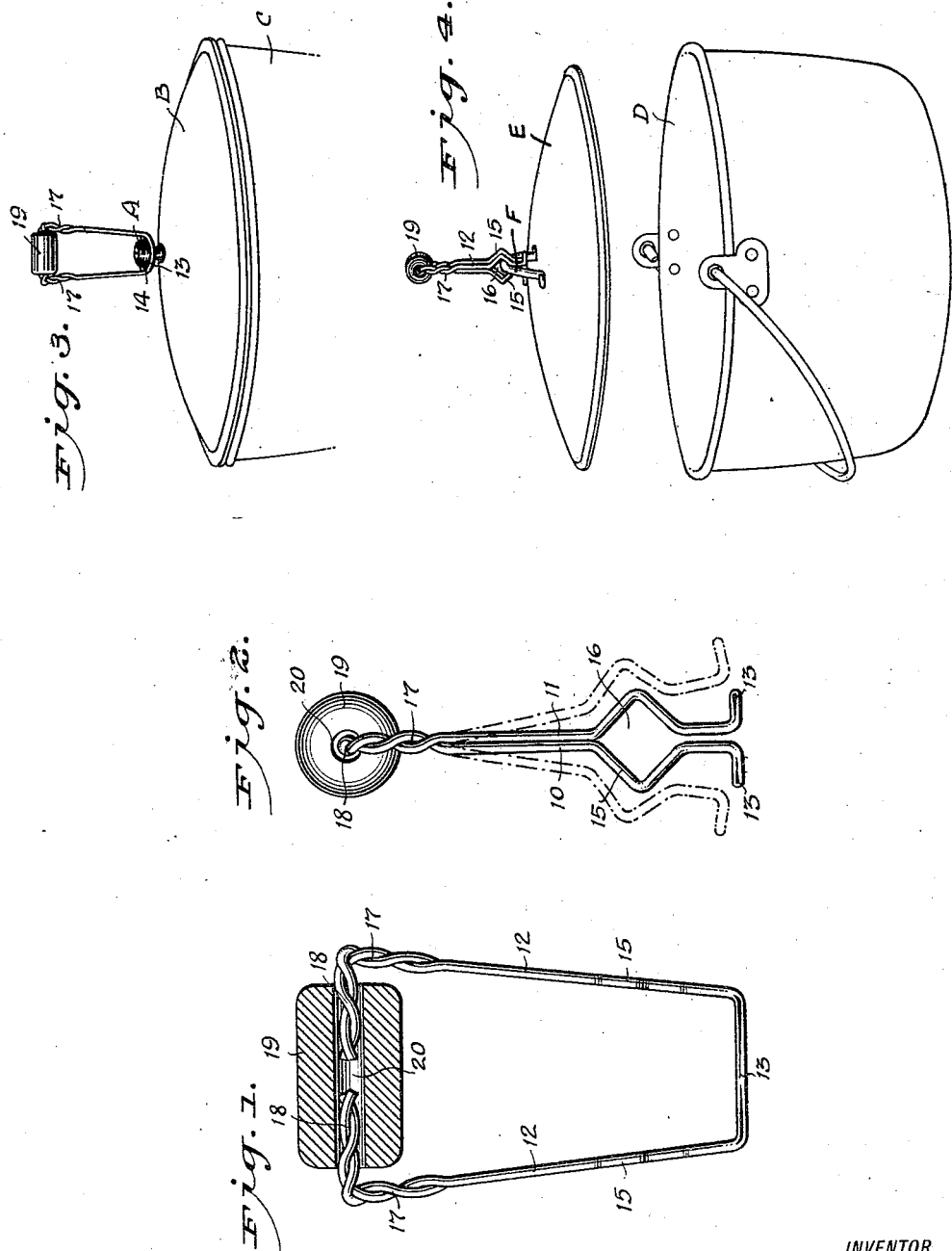
INVENTOR
Charles B. Maloy
BY
ATTORNEYS
WITNESSES Patented May 6, 1924.

1,493,360

UNITED STATES PATENT OFFICE.

CHARLES B. MALOY, OF HOLLIS, NEW YORK.

HANDLE.

Application filed March 20, 1923. Serial No. 626,340.

*To all whom it may concern:*

Be it known that I, CHARLES B. MALOY, a citizen of the United States and a resident of Hollis, borough of Queens, in the county of Queens and State of New York, have invented a new and Improved Handle, of which the following is a full, clear, and exact description.

This invention relates to handles for cooking utensils or the like and aims to provide an auxiliary handle for the purpose of handling pots, pans or other cooking utensils and the lids or covers of the same whereby to prevent the burning of the fingers or hand of the user.

The invention furthermore contemplates a handle of the character described which is extremely simple in its construction, inexpensive to manufacture and produce, and which is highly efficient in its purpose.

With the above recited and other objects in view the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1 is a front view of the handle with parts in section.

Fig. 2 is a side view thereof.

Fig. 3 is a perspective view illustrating one use of the device.

Fig. 4 is a similar view illustrating another use of the device.

Referring to the drawing by characters of reference, the handle consists of a pair of U-shaped members 10 and 11 constituting jaws which are of substantially identical construction, each consisting of a pair of side arms 12 and a bight or connecting portion 13 which is of substantially semicircular or arcuate form. The bights or connecting portions 13 are disposed in confronting relation and project laterally at a right angle with respect to the legs 12 whereby they define an embracing space 14 for a purpose to be hereinafter set forth. The side arms 12 are further provided with laterally offset substantially V-shaped portions 15 which define another embracing space 16, the purpose of which will be hereinafter set forth. The free ends of the arms 12 are intertwisted as at 17 and said intertwisted ends are bent inwardly toward each other as at 18. A gripping member 19 of tubular formation and preferably constructed of wood or some other non-metallic substance which is a non-conductor of heat is provided, said grip member having a longitudinal bore 20 into which the bent portions 18 are engaged from opposite ends.

In practice, the material from which the members or jaws 10 and 11 are constructed is preferably wire or a resilient rod which normally tends to spring the confronting sides of the arms 12 of each member or jaw 10 and 11 toward each other and to yieldably resist separation of the same as illustrated in dotted lines in Fig. 2. Where the device is to be used in connection with the knob A of the lid or cover B of a cooking utensil C illustrated in Fig. 3, the space 14 defined by the arcuate bights or connecting portions 13 of the arms 12 of the jaws 10 and 11 is snapped over the knob to associate handle therewith whereby the grip 19 may be employed for the purpose of handling the cover without the likelihood of the user burning the fingers. Where the device is to be used in connection with a utensil D having a cover E provided with a bail-like handle F, as illustrated in Fig. 4, the space 16 defined by the offset V-shaped portions 15 embraces said handle. It is of course understood that the device is capable of many other uses in connection with hot implements or utensils other than those illustrated and described.

I claim:

1. As a new article of manufacture, a supplemental handle for cooking utensils comprising a grip element, and a pair of resilient U-shaped jaws connected thereto, said jaws having arcuate bight portions defining a knob embracing means and lateral V-shaped offsets in the arms of said jaws defining bail embracing means.

2. A supplemental handle for utensils comprising a pair of resilient U-shaped jaws having connection at one end and relatively separable at their opposite bight ends, a grip element associated with the connected end of said jaws, and complementary offset portions in the bight and side arms of said jaws constituting utensil embracing means.

3. A complementary handle for cooking utensils and the covers or lids thereof, comprising a pair of resilient U-shaped members arranged in parallel relation and having intertwisted connection at the free ends of their side arms, said free ends being turned inwardly toward each other, a grip element having recessed opposite end portions receiving said inturned ends, laterally and oppositely offset embracing portions formed in the side arms, and complementary arcuate embracing portions formed in the bight of each member, as and for the purpose specified.

CHARLES B. MALOY.